March 3, 1953

J. H. ANDERSON 2,629,983

RESONANT EXPLOSION GAS TURBINE
PLANT WITH A MIXING CHAMBER
Filed Jan. 14, 1948

INVENTOR
JAMES H. ANDERSON.
BY
HIS ATTORNEY.

Patented Mar. 3, 1953

2,629,983

UNITED STATES PATENT OFFICE 2,629,983

RESONANT EXPLOSION GAS TURBINE PLANT WITH A MIXING CHAMBER

James H. Anderson, Easton, Pa., assignor to Ingersoll-Rand Company, New York, N. Y., a corporation of New Jersey Application January 14, 1948, Serial No. 2,212

5 Claims. (Cl. 60—39.23)

1

This invention relates to gas turbine plants, and more particularly to a resonant explosion unit having a premixing chamber for generating gases to operate the turbine.

One object of the invention is to premix the constituents of an explosion mixture before introducing them into the explosion chamber of an explosion power unit, thereby assuring a good air fuel ratio which permits a high temperature explosion and thus raises the thermal efficiency of the unit.

Another object is to control the amount of cooling air entering the hot gases in the explosion chamber.

Other objects will be in part obvious and in part pointed out hereinafter.

Figure 1:
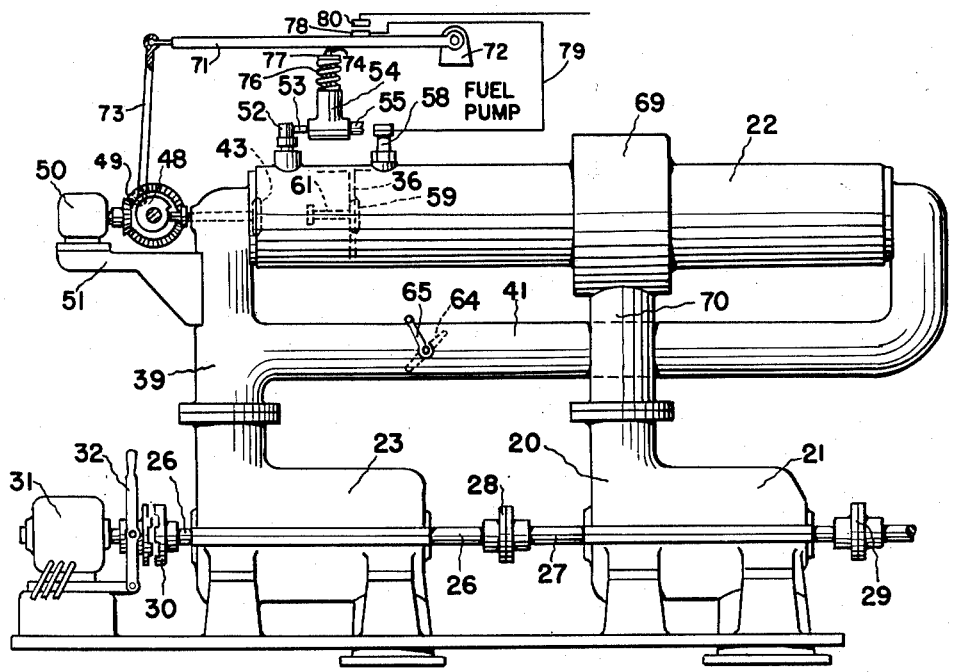
Figure 2:
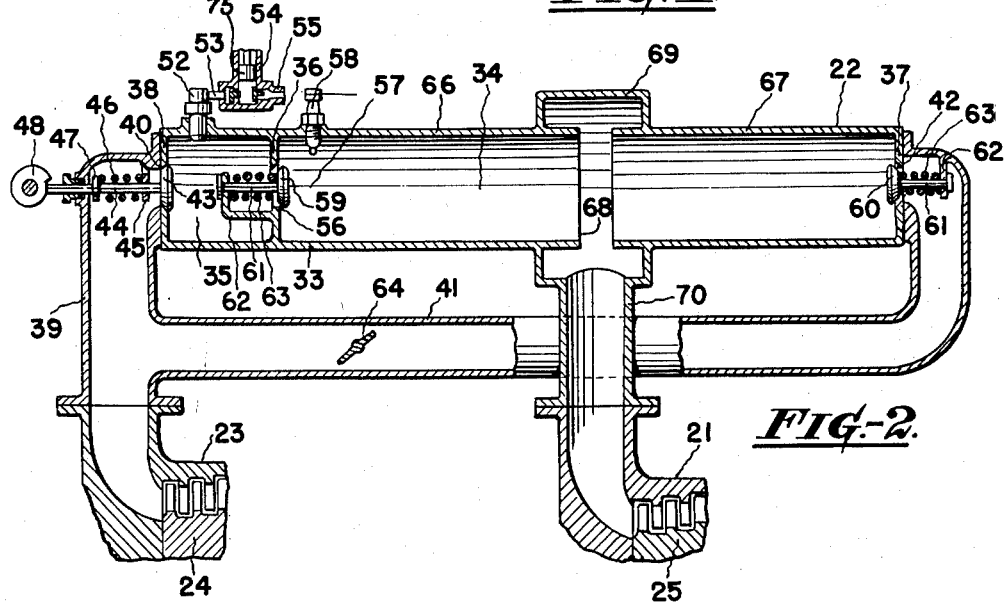

In the accompanying drawing in which similar reference numerals refer to similar parts, Figure 1 is a side elevation of a gas turbine plant showing a resonant explosion chamber constructed in accordance with the practice of the invention, and Figure 2 is a longitudinal view of the gas turbine plant, somewhat enlarged and partly broken away, showing the positions of the controlling devices when at rest.

Referring more particularly to the drawing and at first to Figure 1, a resonant explosion gas turbine plant, designated in general by 20, is shown as including a turbine 21, a resonant explosion power unit 22 for providing operating gases for the turbine and a compressor 23 driven by the turbine for delivering compressed air to the power unit 22.

The compressor and turbine are shown as being of the axial flow type having their rotors 24 and 25 coaxially arranged with each other and the opposed ends of their shafts 26 and 27 connected together by a coupling 28. On the other end of the shaft 27 is a power take-off coupling 29, and the outer end of the shaft 26 carries a clutch member 30 for engagement with a similar member on the shaft of a starting motor 31. An operating lever arm 32 for the clutch is pivoted on the base of the starting motor to make possible the engagement and disengagement of the clutch members.

The resonant explosion power unit 22 comprises a casing 33 which forms an explosion chamber 34 and a premixing chamber 35. Two wall members 36 and 37 on the casing define the ends of the explosion chamber 34 and an end member 38 on the casing defines the outer end of the premixing chamber 35. Compressed air is conveyed from the compressor by a main air conduit 39 through a port 40 in the end member 38

2 into the premixing chamber 35, and a part of the air from the compressor is conveyed by a conduit 41, to one end of the explosion chamber 34 through a port 42 in the wall member 37.

The flow of air through the port 40 is controlled by a mechanically operated valve 43 shown as having its stem 44 extending through a projection 45 in the conduit 39 and through an aperture in said conduit. The valve 43 is constantly pushed toward its seat in the port 40 by a spring 46 acting against a boss 47 on the stem 44 and the projection 45. The outer end of the stem 44 rides on a cam 48 which is rotated through gearing 49 by an auxiliary motor 50 mounted on a platform 51 on the main conduit 39. The rotation of the cam 48 causes the valve 43 to unseat intermittently and allow charges of air to enter the premixing chamber 35.

Fuel is injected into the compressed air in the premixing chamber 35 by a spray nozzle 52 which receives fuel under pressure through a conduit 53 from a fuel pump 54 which may itself receive fuel through a main fuel line 55 from an outside source (not shown). The fuel pump 54 and the valve 43 are operatively related, in any well known manner, such that they function in timed relation. For example, the arrangement disclosed in my Patent No. 2,517,822 may be utilized to obtain the proper timing relation between fuel and air admission and ignition of the explosive mixture. Briefly, that arrangement requires a rocker arm 71 pivoted at one end 72 and actuated by a crank arm 73 connected to the opposite end of the rocker. The crank arm 73 is, in turn, connected to and driven by the motor 50 through the gearing 49. The rocker arm 71 is arranged to engage the end of the stem 74 of the pump piston 75 at a point intermediate the ends of the arm 71 to drive the piston on its power stroke. A spring 76 interposed between the pump casing and a boss 77 on the stem 74 drives the piston on its return stroke.

The timing of ignition is obtained by means of a contact button 78 mounted on the rocker arm 71 and connected by a lead 79 to a spark plug 58, and arranged to contact a contact button 80 on the return stroke of the piston 75. The button 80 is connected to a power source (not shown) so that when the buttons 78 and 80 are in contact, power is supplied to the plug 58 to ignite the explosion mixture in the zone 57. After the fuel is mixed with the compressed air in the premixing chamber 35, it passes through a port 56 in the wall member 36 into an explosion zone 57, located in the explosion chamber 34 adjacent the wall member 36. This explosive mixture is ignited by a spark plug 58 projecting through the casing 33 at a point adjacent the explosion zone 57.

The flow of explosive mixture through the port 56 and the flow of compressed air into the explosion chamber through the port 42 are controlled by valves 59 and 60, respectively, which acts in response to the pressure waves in the explosion chamber. Said valves are shown as being of the poppet type and have their stems 61 extending through support projections 62. The valves 59 and 60 are normally held unseated by spring 63 encircling the stems 61 and acting against the projections 62 and the valves.

The amount of cooling air entering the hot explosion gases in the explosion chamber may be selectively varied by a throttle valve 64 provided in the conduit 41. In this case, the valve 64 is operated manually by a lever 65 connected to that portion of the valve 64 extending outside the conduit 41.

The portion of the casing 33 defining the explosion chamber 34 comprises two cup-shaped members 66 and 67 having their inner open ends spaced to provide an exhaust or discharge opening 68 therebetween for the escape of the exhaust gases. Surrounding this opening and attached to the casing 33 is a housing ring 69 which forms a passage for conveying the explosion gas to a discharge conduit 70 leading to the inlet of the turbine 21.

The length of the chamber 34 is so chosen and the frequency of the explosions in the chamber is so timed that when the pressure wave from an explosion is at its peak in one end of the chamber it will simultaneously be at its lowest value in the other end of the chamber and, to this end, the end walls 36 and 37 of the explosion chamber are spaced apart approximately one half of a pressure wave length or an odd multiple thereof. The manner in which this pressure condition may be attained is fully disclosed in copending application, Serial No. 792,066, filed December 16, 1947, and consists in general of measuring, in any well known manner, the pressures at the opposite ends of the explosion chamber and varying the speed of the means for actuating the fuel pump 54 and for completing the electrical circuit in which the plug 58 is connected, in accordance with these pressures until this condition—namely, maximum pressure at one end of the explosion chamber and, simultaneously, minimum pressure at the opposite end thereof, is approximated. Of course, the speed of the motor 50 for actuating the valve 43 is regulated, in any well known manner as by controlling the voltage impressed thereon, so that the valve 43 operates in the timed relation, with respect to the ignition of the explosive mixtures in the chamber 34, as hereinbefore set forth. The end wall 37 also serves as a reflecting member to reverse the peak of the pressure waves for return movement to their points of origin.

At the beginning of an operating period of the plant and assuming the throttle valve 64 to be closed, the starting motor 31 imparts rotary movement to the rotors 24 and 25 causing compressed air to flow through the conduits 39 and 41. If then the auxiliary motor 50 and the fuel pump 54 are put into operation, the valve 43 will be momentarily unseated by the cam 48 allowing a charge of air to enter the premixing chamber 35, and fuel will be injected into such charge through the spray nozzle 52. With the introduction of a second charge of air into the premixing chamber through the port 40, the first charge of explosive mixture is expelled through the port 56 into the explosion zone 57 and is ignited at the spark plug 58. This initial explosion forces the valve 59 to its seat, thereby cutting off the further flow of explosive mixture through the port 56, and the pressure wave of the explosion travels towards the opposite end of the chamber 34 causing a low pressure area to exist in front of the valve 59 which permits the valve to open and admit a new charge of explosive mixture into the explosion zone 57.

After the initial explosion occurs, the throttle valve 64 is opened so that some of the air from the compressor 23 passes through the port 42 into the explosion chamber 34 to cool the explosion gases therein. However, as the peak of the pressure wave reaches the opposite end of the explosion chamber, it forces the valve 60 to its seat thus cutting off the flow of cooling air through the port 42. Upon hitting the end wall 37, the peak of the pressure wave is reflected back towards its point of origin and, as it reaches the explosion zone 57, it compresses the second charge of explosive mixture in the chamber. Since at this time the trough of the wave is passing the port 42, the low pressure at that point allows the valve 60 to open and admit a second charge of cooling air into the chamber 34. At the peak of compression of the charge of explosive mixture in the explosion zone 57 the charge is ignited and a repetition of the above described cycle follows.

It will be readily understood that the amount of cooling air passing into the chamber through the port 42 may be controlled by manually adjusting the throttle valve 64 after the unit has been put into operation. By selectively varying the position of the valve 64, the exhaust gases are cooled to such a degree that the most efficient operation of the turbine 21 may be attained.

It is to be further understood that the fuel pump 54, the valve 43, and the sparking mechanism 58 operate in timed relation with each other. Thus, air and fuel are mixed thoroughly in the premixing chamber while the preceding explosion is occurring. In this premixing process, then, an explosive mixture may be formed having a good air-fuel ratio which assures a high temperature explosion in the explosion chamber 34 and consequently a high thermal efficiency for the unit.

From the foregoing description it will be apparent to those skilled in the art to which the invention appertains that modifications and changes may be made without departing from the spirit of the invention or the scope of the appended claims.

I claim:

1. A resonant explosion power unit, comprising a casing having a premixing chamber and an explosion chamber whose length approximates one half of an explosion wave length, a partition between the premixing and explosion chambers, means for introducing the constituents of an explosive mixture into the premixing chamber, means in the partition acting responsively to variations in pressure in the explosion chamber for controlling the flow of explosive mixture thereinto, means for igniting the explosive mixture in one end of the explosion chamber, pressure-responsive valve means at the other end of the explosion chamber for allowing cooling air to enter thereinto, and an exhaust opening for removing the exhaust gases from the explosion chamber.

2. A resonant explosion power unit, comprising a casing having a premixing chamber and an explosion chamber whose length approximates one half of an explosion wave length, a partition in the casing between said chambers and having an opening therethrough, means for introducing constituents of an explosive mixture into the premixing chamber, intermittently operable valve means for controlling the flow of explosive mixture through said opening into one end of the explosion chamber, means at said one end only for igniting the explosive mixture in the explosion chamber, pressure-responsive valve means in the casing at the opposite end of the explosion chamber for allowing cooling air to enter into the explosion chamber, a conduit for conveying the cooling air to the last mentioned means, valve means in the conduit for selectively varying the amount of cooling air passing into the explosion chamber, and an exhaust opening for the explosion chamber.

3. A resonant explosion power unit, comprising a casing having a premixing chamber and an explosion chamber, wall members on the casing at the opposite ends of the explosion chamber, an end member on the casing and co-operating with one of said wall members to define said premixing chamber and having an inlet port therein, valve means for controlling the flow of air through the inlet port, a motor for operating said valve means, fuel injection means for introducing fuel into the air in the premixing chamber to form an explosive mixture, pressure-responsive valve means in the wall member co-operating with the end member for admitting charges of the explosive mixture into the explosion chamber, means for igniting the charge in the explosion chamber, valve means in the other wall member acting responsively to the pressure waves in the explosion chamber for allowing cooling air to enter thereinto, and an exhaust opening in the casing intermediate the wall members for the passage of exhaust gases from the explosion chamber.

4. An explosion power unit comprising, a casing, transverse walls in said casing defining an explosion chamber and a premixing chamber therebetween, an intermittently operable valve in one of said walls for controlling the flow of air into the premixing chamber, means in another of said walls for permitting the flow of air and fuel from the premixing chamber into the explosion chamber and restricting the flow of fluid from the explosion chamber into the premixing chamber, a nozzle in the casing for introducing fuel into the air in the premixing chamber, an intermittently operable spark plug for igniting the mixture of fuel and air in the explosion chamber, and an exhaust opening in the casing for removing exhaust gases from the explosion chamber.

5. An explosion power unit for compressing a gas comprising, a casing having walls at the opposite ends thereof, a partition in one end portion of the casing dividing the casing into an explosion chamber and a premixing chamber, a valve in an end wall of the casing for admitting a gas into the premixing chamber, a motor for intermittently operating said valve, a valve in the other end wall and acting in response to variations in pressure within the explosion chamber for controlling the flow of a gas into the explosion chamber, means in the partition for permitting the flow of gas and fuel therethrough from the premixing chamber into the explosion chamber, a nozzle in the casing for introducing fuel into the premixing chamber, an intermittently operable spark plug for igniting the fuel and gas mixture in the explosion chamber, and a gas outlet in the casing substantially midway between the said other end wall and the partition.

JAMES H. ANDERSON.

REFERENCES CITED

The following references are of record in the file of this patent:

UNITED STATES PATENTS

| Number | Name | Date |
|---|---|---|
| 1,126,799 | Lindberg | Feb. 2, 1915 |
| 1,793,640 | Schilling | Feb. 24, 1931 |
| 2,353,929 | Ray | July 18, 1944 |
| 2,425,121 | Peterson | Aug. 5, 1947 |
| 2,480,626 | Bodine | Aug. 30, 1949 |
| 2,512,254 | Mallory | June 20, 1950 |
| 2,523,379 | Kollsman | Sept. 26, 1950 |
| 2,546,966 | Bodine | Apr. 3, 1951 |
| 2,550,515 | Anderson | Apr. 24, 1951 |

FOREIGN PATENTS

| Number | Country | Date |
|---|---|---|
| 27,724 | Great Britain | Dec. 16, 1907 |
| 176,838 | Great Britain | Mar. 6, 1922 |
| 188,642 | Great Britain | Nov. 29, 1923 |
| 386,908 | Great Britain | Jan. 26, 1933 |
| 574,554 | Great Britain | Jan. 10, 1946 |
| 374,124 | France | Apr. 10, 1907 |